Aug. 25, 1925.  F. J. BURNS  1,550,674
PULSATOR FOR MILKING MACHINES
Filed April 21, 1921  2 Sheets-Sheet 1

Inventor:
Frank J. Burns
By *his Attorney.*

Aug. 25, 1925.

F. J. BURNS 1,550,674

PULSATOR FOR MILKING MACHINES

Filed April 21, 1921    2 Sheets-Sheet 2

Inventor:
Frank J. Burns
By
his Attorney.

Patented Aug. 25, 1925.

1,550,674

UNITED STATES PATENT OFFICE.

FRANK J. BURNS, OF LOMIRA, WISCONSIN.

PULSATOR FOR MILKING MACHINES.

Application filed April 21, 1921. Serial No. 463,243.

*To all whom it may concern:*

Be it known that I, FRANK J. BURNS, a citizen of the United States, residing at Lomira, in the county of Dodge and State of Wisconsin, have invented a new and useful Improvement in Pulsators for Milking Machines, of which the following is a specification.

My invention relates to pulsators for milking machines and has for its object to provide a device for use in connection with milking machines of the type having a teat cup with a flexible inner lining adapted to be periodically inflated and deflated.

A special object of the invention is to provide a pulsator having a driving mechanism adapted to be operated by the suction of the milking machine.

In carrying out my objects I provide an air motor or turbine adapted to be operated by the suction from the milking machine together with the necessary valve mechanism for operating the pulsator.

The full objects and advantages of my invention will appear in connection with the detailed description thereof and are particularly pointed out in the claims.

In the drawings, illustrating the application of my invention in one form:—

Figure 2:
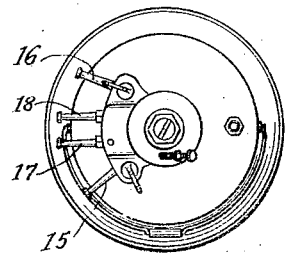
Fig. 2 is a plan view of the device shown in Figure 1.
Figure 1:
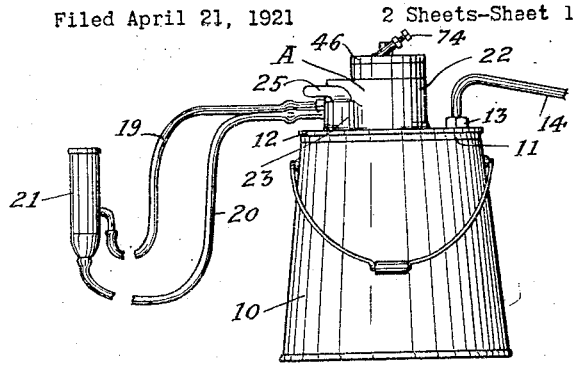
Fig. 1 is an elevational view of a portion of a milking machine showing my invention applied thereto.

My invention is particularly adapted to the type of milking machine operating entirely by suction. In the drawings I have shown a milk receiver 10 of ordinary construction having a flat rim 11 on which is adapted to be positioned a cover plate 12. The cover plate 12 carries all the controlling mechanism for each milking machine and has attached to it a nipple 13 over which is inserted a hose 14 leading to the suction line of the system which is not shown in the drawings. On the top of the cover 12 is a valve chamber A which has leading from it pairs of nipples 15 and 16, 17 and 18 as best shown in Figure 2. In Figure 1, I have shown nipples 16 and 18 having attached to them two hose 19 and 20 which lead to a teat cup 21 of ordinary construction embodying a flexible inner lining. The details of this cup are not shown in the drawings due to the fact that they are well known in the art and hence are thoroughly understood. The hose 19 leads to the chamber between the inner lining and the outer lining of the cup while the hose 20 leads to the inner chamber and creates a direct suction within the cup and serves to convey the milk from the cup into the receiver 10.

In ordinary use of a device of the kind specified an alternate change of pressure from atmospheric to partial vacuum is successively effected in the hose 19 which causes the flexible lining within cup 21 to be successively inflated and deflated thereby giving an action upon the cow's teat which is similar to that used in hand milking. At the same time a constant suction is maintained on the hose 20 which serves to draw the milk from the cup and discharge it into the receiver 10. I have provided my invention with two sets of nipples as shown in Figure 2 so that both sides of the cow's udder may be simultaneously milked. Although but one cup has been shown in Figure 2 for the purposes indicating connections of the hose thereto it can readily be understood that two pairs of cups are used, each of the hose 19 and 20 being forked to lead to two cups so that with two sets of nipples shown in Figure 2, four cups may be milked at one application.

Figure 3:
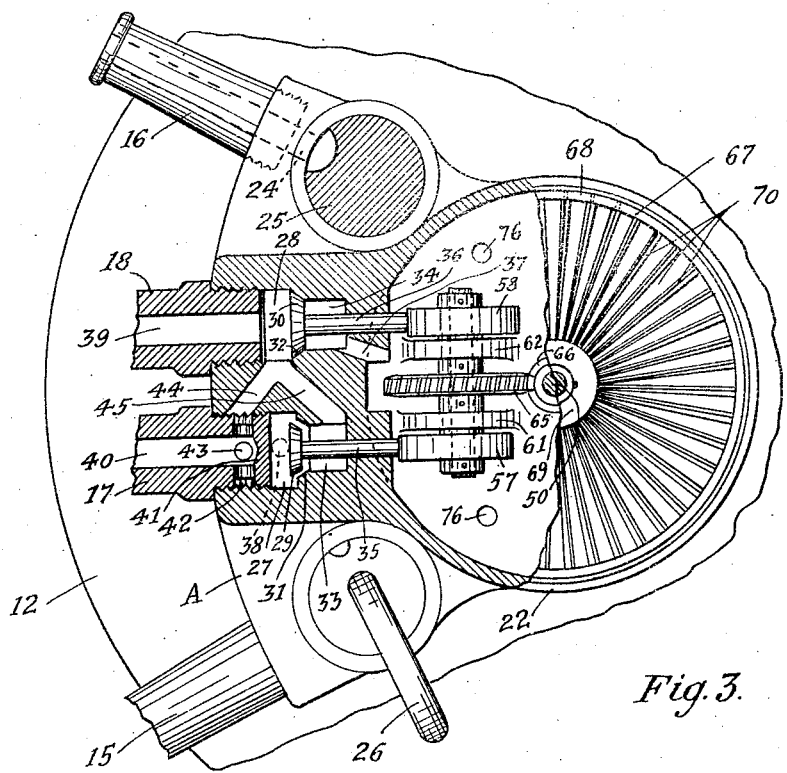
Fig. 3 is a fragmentary sectional view of some of the parts.

The valve mechanism for effecting the pulsation in the cups 21 is best shown in Figure 3. Valve chamber A comprises a cylindrical portion 22 in which is mounted the operating mechanism, and an arcuate casting or portion 23 in which the valve mechanism is contained. All of the four nipples 15, 16, 17 and 18 are screwed into the casting 23 as clearly shown in Figure 3. When the hose 14 is connected to the suction line the entire interior of the receiver 10 is exhausted forming a partial vacuum within the same. Nipples 15 and 16 communicate through passageways 24 which lead directly into the circular portion 22 of valve chamber A and from there on into the interior of the receiver 10, whereby a constant suction is maintained in the teat cup through the hose 20. A pair of hand operated valves 25 and 26 interposed within the passageways 24 between nipples 16 and 15 and the interior of the receiver 10 serve to shut off the suction in the cups when a portion of the udder of the cow has been milked and the cups are desired to be removed.

Nipples 17 and 18 which screw into the casting 23 screw into internal valve chambers 27 and 28 which are best shown in Figure 3. Valve chambers 27 and 28 are formed with valve members 29 and 30 mounted on seats 31 and 32 adapted to close the ends of said chamber from communication with other valve chambers 33 and 34 formed on the other sides of the seats 31 and 32. The valves 29 and 30 are provided with valve stems 35 and 36 which are slidably mounted on the casting 23 and extend into the interior of the chamber 22 where the same are operated in a manner to be later described. A port 37 communicates with chamber 34 and with the interior of the receiver 10 so that chamber 34 is always under partial vacuum. A port 38 connects the chamber 27 with the atmosphere so that said chamber is always at atmospheric pressure.

The means for successively bringing the two nipples 17 and 18 into communication with the chambers 27 and 34 will now be described. Nipple 18 is formed with an internal passageway 39 which leads directly into the valve chamber 28. Nipple 17 is formed with a passageway 40 which extends into the same but terminates short of the end thereof as indicated at 41. A groove 42 extends around the perifery of the threaded portion of nipple 17 near the end thereof and has a number of holes 43 drilled through the metal of said nipple to connect with the passageway 40. A port 44 drilled through casting 23 connects the annular space of groove 42 with chamber 28 so that the interior of passageway 40 of nipple 17 is continually in communication through holes 43 and the annular groove 42 with the chamber 28. A similar port 45 connects the valve chamber 33 with the valve chamber 28.

The operation of the valve mechanism is as follows. When valve 30 is held closed and valve 29 is held open as shown in Fig. 3 after the cups 21 have been exhausted, air rushes in from the atmosphere through the port 38 and into the valve chamber 27. The valve 29 being open permits the flow of air between valve seat 31 and into the chamber 33 from which the air flows through the port 45 and into the chamber 28. From chamber 28 the air divides, part rushing directly through the passageway 39 and nipple 18 and from there on to one set of teat cups. The other portion passes through port 45, the groove 42 and holes 43 into the passageway 40 and from there on to the other set of teat cups. In this manner both sets of cups are simultaneously inflated. When the valve action is reversed and valve 29 seated on seat 31 and the valve 30 projected from its seat the following action takes place. In that condition valve chamber 27 is completely closed while the valve chamber 34 is brought into communication with chamber 28. In this position of the valves air is simultaneously drawn from the two sets of cups through the ports 40 and 39, in nipples 17 and 18 through the holes 43, the annular groove 42 and port 44 into chamber 28 from which it is exhausted into chamber 34 past the valve 30 and valve seat 32 and from thereon into the interior of the receiver 10 through the port 37 where the air collected is removed into the suction line through the hose 14. It can hence be clearly seen that in operation the simple alternating reciprocation of valves 28 and 30 serves to operate the teat cups to give the desired pulsating inflation and deflation of the inner-lining as desired.

Figure 4:
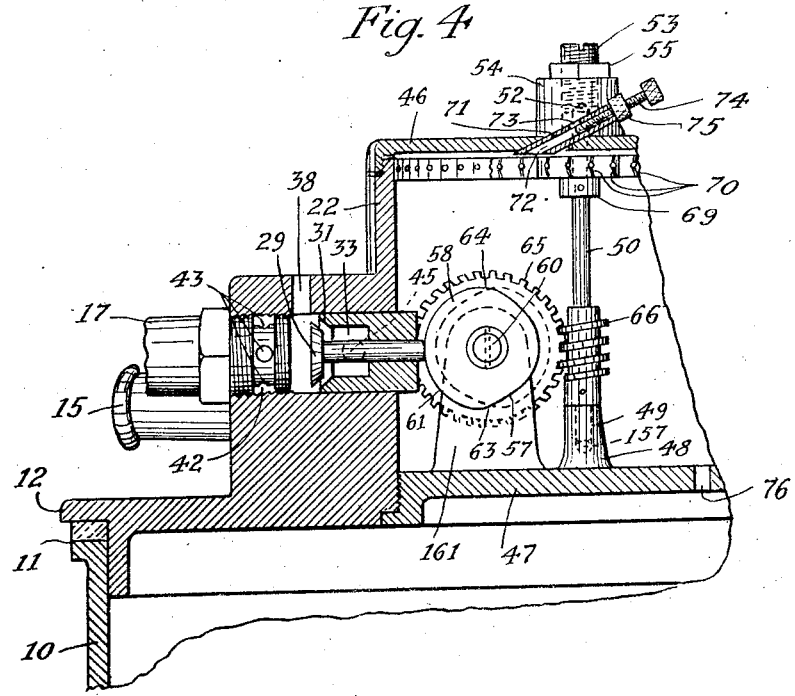
Fig. 4 is an elevational sectional view on line 4—4 of Fig. 3.

The device for operating valve stems 35 and 36 is entirely contained within the cylindrical portion 22 of member A and is best shown in Figures 4 and 3. The cylindrical portion 22 is formed open at its top and bottom and is threaded to receive a solid cap 46 and a bottom plate 47 perforated at 76 as best shown in Figure 4. Bottom 47 is formed with a vertical boss 48 which is drilled at 49 to receive the lower portion of a vertical shaft 50 positioned in the center of the casing 22. This shaft rests upon a ball 51 positioned in the bottom of the cavity 49 formed in said boss 48. Shaft 50 is formed at its other end with a conical head 52 which is adapted to be seated in a socketed bearing 53 which is screwed into a boss 54 formed on the cover 46. A lock nut 55 serves to hold the bearing 53 properly positioned on the conical end 52 of shaft 50 so that said shaft rotates freely with a minimum amount of play.

For moving valve stems 35 and 36 I provide a pair of cams 57 and 58 which are secured to a shaft 60 journaled in two uprights 61 and 62 formed integral with the bottom 47 secured to the cover plate 12. Cams 57 and 58 are formed with circular portions 63 and 64 which hold these valves alternately in open position for a period of time substantially equal to half a revolution of the shaft 60. It will, however, be noted that at the points on said cams, as clearly shown in Figure 4, that both valves are momentarily closed so that leakage of air through the port 38 from the atmosphere and directly into receiver 10 is prevented. For operating these cams I provide a worm wheel 65 mounted on shaft 60 which meshes with a worm 66 secured to the shaft 50.

The device for rotating shaft 50 is best shown in Figures 3 and 4. A wheel 67 is employed which has a rim 68 and a hub 79 secured to shaft 50. This hub 69 and rim 68 are interconnected by a number of blades 70 which serve as spokes and form a fan or rotor so to speak. The fan or rotor thus described is indicated in its entirety at B and is driven by a current of air through a leakage port, which air current is effected by means of the suction within the receiver 10. For directing this air current on to the blade 70 of rotor B, I provide a stem or neck 71 which is angularly mounted on the top of the cover 46 and which has a passageway 72 leading directly in angular position to said blade 70. A leakage port 73 brings passageway 72 in communication with the atmosphere. As the receiver 10 is exhausted, air from the atmosphere is caused to rush into port 73 in the passageway 72 and is directed against the blade 70 of rotor B causing the same to rotate. A screw 74 screwable in the end of neck 71 is adapted to cover or uncover port 73 so that the amount of air discharged against the rotor B may be varied at will. A lock nut 75 screwable on screw 74 serves to hold said screw in fixed position after the adjustment of the same has been determined.

The operation of the device is very effective. The valves 29 and 30 are held against the cams 57 and 59 by air pressure so that no spring action is necessary, thereby reducing the amount of energy required to operate the device. The rotor B being mounted on the ball 57 and a conical bearing 71 rotates very freely thereby utilizing a minimum amount of energy in overcoming friction. I have found that the amount of air required to operate the device is exceedingly small so that the degree of suction within the receiver is not appreciably changed by the adaptation of my invention for operating the pulsator. By properly manipulating screw 74 the speed of the device can be actually regulated so that the rapidity of the pulsator can be controlled at will. The device is very effective and positive in operation and is exceedingly simple in construction.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

I claim:—

1. A pulsator comprising a passageway leading to a test cup, a pair of chambers, one of which is normally under partial vacuum, the other of which is normally at atmospheric pressure, a pair of valves in said chambers, ports from said chambers to said passageway and means for operating said valves to cause the same to alternately open and close to bring said pressure and vacuum chambers alternately in communication with said passageways.

2. A pulsator comprising two chambers, a pair of members connected with said chambers in communication with a pair of teat cups, one of said chambers being normally under partial vacuum, the other of said chambers being normally at atmospheric pressure, ports connecting said members with said chambers and valves for alternately placing said members in communication with said vacuum and pressure chambers.

3. A pulsator comprising a casing having two chambers formed therein, a pair of hose connecting members screwed into said chambers, a pair of valve members dividing said chambers into a central and inner compartments, a port leading from one of said central compartments to the atmosphere, a port leading from one of said inner compartments to a suction chamber, and ports bringing said hose connecting members into communication with said other inner and central compartment and means for alternately operating said valves.

4. A pulsator comprising a casing having two chambers formed therein, a hose connection secured to said chamber having a port connecting with the interior thereof, a second hose connecting member having a solid end dividing said chamber into two compartments, a port connecting said other chamber with the interior bore of said second hose connection, a pair of valves interposed in the middles of said chambers dividing the same into central and inner compartments, a port connecting said central compartment adjacent said closed head with the atmosphere, a port connecting said inner chamber adjacent said atmospheric port with the central compartment of said other chamber, a port connecting said other inner chamber to the suction line and means for alternately operating said valves.

5. A pulsator for milking machines comprising a cylindrical casing having a cylindrical chamber therein, an extension formed on one side of said casing, a pair of valve chambers within the casing extension, a port leading from one of said valve chambers to the vacuum chamber, a port leading from the other of said valve chambers to the atmosphere, valves within said valve chambers having valve stems adapted to project inwardly within said vacuum chamber and means within said vacuum chamber for alternately engaging said valve stems to operate said valves.

6. A pulsator for milking machines comprising a casing having two valve chambers, a suction chamber, a port leading from one of said chambers to said suction chamber, a port leading from the other chamber to the atmosphere, passageways leading from both of said chambers to a number of teat cups and a port connecting said two valve chambers.

7. A casing having a vacuum chamber, suction and compression valves positioned within said casing, a chamber formed on the head side of said suction valve, a passageway leading from said chamber to a teat cup, a valve chamber formed on the stem side of said suction valve, a port leading from said chamber to said vacuum chamber, another valve chamber formed on the head side of said compression valve, a port leading from said valve chamber to the atmosphere, another valve chamber positioned on the stem side of said compression valve, a port leading from said valve chamber to the valve chamber on the head side of said suction valve, and means for alternately operating said valve to place said passageway to said teat cup alternately in communication with said vacuum chamber and the atmosphere.

8. A casing having a vacuum chamber, suction and compression valves positioned within said casing, a chamber formed on the head side of said suction valve, a passageway leading from said chamber to a teat cup, a valve chamber formed on the stem side of said suction valve, a port leading from said chamber to said vacuum chamber, another valve chamber formed on the head side of said compression valve, a port leading from said valve chamber to the atmosphere, another valve chamber positioned on the stem side of said compression valve, a port leading from said valve chamber to the valve chamber on the head side of said suction valve, a second passageway leading to a second teat cup and a port connecting said second passageway with the valve chamber on the head side of said suction valve.

In testimony whereof I affix my signature.

FRANK J. BURNS.